(12) United States Patent
Dyson et al.

(10) Patent No.: US 10,577,942 B2
(45) Date of Patent: Mar. 3, 2020

(54) DOUBLE IMPINGEMENT SLOT CAP ASSEMBLY

(71) Applicant: General Electric Company, Schenectady, NY (US)

(72) Inventors: Thomas Earl Dyson, Niskayuna, NY (US); Daniel Getsinger, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 15/354,072

(22) Filed: Nov. 17, 2016

(65) Prior Publication Data
US 2018/0135423 A1    May 17, 2018

(51) Int. Cl.
*F01D 5/18* (2006.01)
*F01D 5/14* (2006.01)
(Continued)

(52) U.S. Cl.
CPC .............. *F01D 5/18* (2013.01); *F01D 5/147* (2013.01); *F01D 5/187* (2013.01); *F01D 9/065* (2013.01); *F01D 5/146* (2013.01); *F01D 5/186* (2013.01); *F01D 5/284* (2013.01); *F05D 2220/32* (2013.01); *F05D 2240/121* (2013.01); *F05D 2240/303* (2013.01); *F05D 2250/75* (2013.01);
(Continued)

(58) Field of Classification Search
CPC ........... F01D 5/186; F01D 5/187; F01D 5/147
See application file for complete search history.

(56) References Cited

U.S. PATENT DOCUMENTS 4,565,490 A * 1/1986 Rice .................. F01K 23/10
                                                  415/114
4,859,147 A * 8/1989 Hall .................. F01D 5/186
                                                  416/97 R (Continued)

FOREIGN PATENT DOCUMENTS

EP    1 087 103 A2    3/2001
EP    1 933 007 A2    6/2008
(Continued)

OTHER PUBLICATIONS

Taslim et al., "Experimental and Numerical Study of Impingement on an Airfoil Leading Edge With and Without Showerhead and Gill Film Holes", ASME, Journal of Turbomachinery, vol. 128, Issue: 2, pp. 310-320, Feb. 1, 2005.

(Continued)

*Primary Examiner* — Ninh H. Nguyen
*Assistant Examiner* — Behnoush Haghighian
(74) *Attorney, Agent, or Firm* — Philip S. Hof; The Small Patent Law Group, LLC

(57) ABSTRACT

An assembly comprises a cooling chamber disposed inside an airfoil of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly directs the cooling air exiting the cooling chamber in the airfoil through the impingement hole along one or more outer surfaces of the airfoil.

20 Claims, 7 Drawing Sheets

(51) Int. Cl.
*F01D 9/06* (2006.01)
*F01D 5/28* (2006.01)

(52) U.S. Cl.
CPC .. *F05D 2260/201* (2013.01); *F05D 2260/202* (2013.01)

(56) References Cited

U.S. PATENT DOCUMENTS

| | | | |
|---|---|---|---|
| 5,486,093 A | 1/1996 | Auxier et al. | |
| 6,099,251 A * | 8/2000 | LaFleur | F01D 5/147 415/115 |
| 6,200,092 B1 * | 3/2001 | Koschier | F01D 5/146 415/191 |
| 6,981,840 B2 * | 1/2006 | Lee | F01D 5/187 415/115 |
| 7,011,502 B2 * | 3/2006 | Lee | F01D 5/187 416/97 R |
| 7,056,093 B2 * | 6/2006 | Self | F01D 5/186 415/115 |
| 7,273,351 B2 * | 9/2007 | Kopmels | F01D 5/186 416/97 R |
| 7,316,539 B2 * | 1/2008 | Campbell | F01D 5/146 244/123.1 |
| 7,540,712 B1 * | 6/2009 | Liang | F01D 5/186 416/1 |
| 8,016,564 B1 * | 9/2011 | Liang | F01D 5/186 415/115 |
| 8,870,536 B2 | 10/2014 | Lacy | |
| 9,022,737 B2 | 5/2015 | Piggush et al. | |
| 9,228,440 B2 | 1/2016 | Kollati et al. | |
| 9,327,384 B2 | 5/2016 | Bunker | |
| 10,352,181 B2 | 7/2019 | Vogel | |
| 2005/0232769 A1 | 10/2005 | Lee et al. | |
| 2005/0281675 A1 * | 12/2005 | Liang | F01D 5/187 416/97 R |
| 2010/0068069 A1 * | 3/2010 | Ahmad | F01D 5/186 416/97 R |
| 2016/0010465 A1 * | 1/2016 | Slavens | F01D 5/186 415/115 |

FOREIGN PATENT DOCUMENTS

| | | |
|---|---|---|
| WO | 2015112225 A2 | 7/2015 |
| WO | 2015191037 A1 | 12/2015 |
| WO | 2015195088 A1 | 12/2015 |

OTHER PUBLICATIONS

Extended European Search Report and Opinion issued in connection with corresponding EP Application No. 17200754.4 dated Feb. 19, 2018.

\* cited by examiner

DOUBLE IMPINGEMENT SLOT CAP ASSEMBLY

FIELD

The subject matter described herein relates to cooling assemblies for equipment such as turbine airfoils.

BACKGROUND

The leading edge region of a turbine airfoil is subjected to some of the highest head loads when an engine is operating. To protect the airfoil from damage, cooling air may be directed in and/or onto the airfoil. Cooling provided by a combination of impingement jets and film cooling air can prevent thermal damages to the airfoils.

One issue with cooling known airfoil assemblies, however, is that an excessive quantity of coolant is required to sufficiently cool the leading edge of the turbine airfoils. Additionally, due to geometric constraints of the leading edge of the airfoil, there are limited strategies for cooling the leading edge of the airfoil as well as downstream from the leading edge. Such an improved system may provide improved cooling of critical portions of the turbine assembly, enable more efficient operation of the engine, and improve the life of the turbine machinery. This can be achieved through increases in the firing temperature, reductions in the cooling flow, or a combination.

BRIEF DESCRIPTION

In one embodiment, an assembly comprises a cooling chamber disposed inside an airfoil of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly directs the cooling air exiting the cooling chamber in the airfoil through the impingement hole along one or more outer surfaces of the airfoil.

In one embodiment, an assembly comprise a cooling chamber disposed inside of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly directs the cooling air exiting the cooling chamber in the airfoil through the impingement hole along one or more outer surfaces of the airfoil. The double impingement slot cap assembly is spaced apart from the airfoil and is coupled with the airfoil by one or more supports.

In one embodiment, an assembly comprises a cooling chamber disposed inside an airfoil of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly is separated from the airfoil by opposite slots that are elongated in directions extending along one or more of the leading edge of the airfoil or the stagnation region of the airfoil. The double impingement slot cap assembly directs the cooling air exiting the cooling chamber in the airfoil through the impingement hole along one or more outer surfaces of the airfoil. The double impingement slot cap assembly is spaced apart from the airfoil and is coupled with the airfoil by one or more supports.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
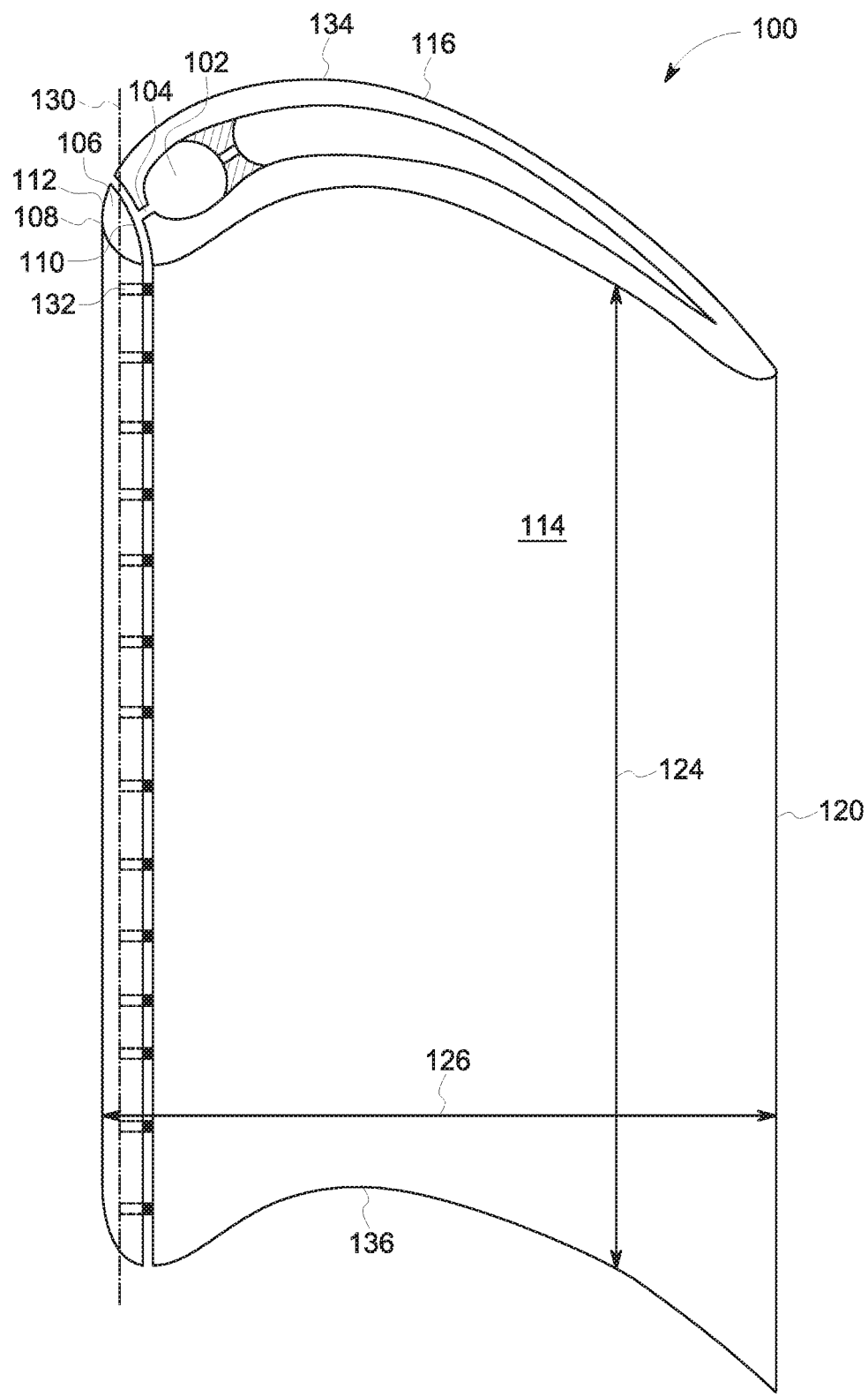
FIG. 1 illustrates a perspective view of an airfoil in accordance with one embodiment.

FIG. 1 illustrates a perspective view of an airfoil 100 in accordance with one embodiment. The airfoil 100 may be a turbine blade, a stationary guide vane, or the like, used in a turbine assembly (not shown). The airfoil 100 has a pressure side 114 and a suction side 116 that is opposite the pressure side 114. The pressure side 114 and the suction side 116 are interconnected by a leading edge 112 and a trailing edge 120 that is opposite the leading edge 112. The pressure side 114 is generally concave in shape, and the suction side 116 is generally convex in shape between the leading and trailing edges 112, 120. For example, the generally concave pressure side 114 and the generally convex suction side 116 provides an aerodynamic surface over which compressed working fluid flows through the turbine assembly.

The airfoil 100 extends an axial length 126 between the leading edge 112 and the trailing edge 120. The trailing edge 120 is disposed proximate a shaft of the turbine assembly relative to the leading edge 112 along the axial length 126. The airfoil 100 extends a radial length 124 between a first end 134 and a second end 136. For example, the axial length 126 is generally perpendicular to the radial length 124.

A stagnation region 130 is generally parallel with an axis along the radial length 124 of the airfoil. Optionally, the stagnation region 130 may be non-parallel with an axis along the radial length 124. For example, a stagnation region 130 may be non-parallel with an axis along the radial length of a twisted airfoil. The stagnation region 130, positioned at the leading edge 112 between the pressure and suction sides 114, 116, is the region of maximum static pressure that divides fluid flow between the pressure and suction sides 114, 116 of the airfoil 100. For example, hot compressed air transferring through the turbine assembly divides at the stagnation region to flow across the pressure and suction sides 114, 116 in a direction along the axial length 126. The portion of the leading edge 112 that lies beneath the stagnation region 130 is exposed to the highest temperature of the hot compressed gas transferring through the turbine assembly.

The airfoil 100 has an internal cooling chamber 102. The cooling chamber 102 is disposed within the interior of the airfoil 100. For example, the cooling chamber 102 is entirely contained within the airfoil 100 between the pressure side 114 and the suction side 116. In the illustrated embodiment, the cooling chamber 102 is generally round in shape. Optionally, the cooling chamber 102 may be any alternative shape and/or size. The cooling chamber 102 is configured to direct cooling air inside of the airfoil 100 in order to cool the airfoil 100 when the turbine assembly is operating. For example, the cooling air is directed through the airfoil 100 in order to cool the leading edge 112 of the airfoil 100.

The cooling chamber 102 is fluidly coupled with an impingement hole 104. The impingement hole 104 is disposed between the cooling chamber 102 and the leading edge 112. For example, the impingement hole 104 is located closer to the leading edge 112 and distal the trailing edge 120 than the cooling chamber 102. The impingement hole 104 directs some of the cooling air out of the cooling chamber 102 in a direction towards the leading edge 112. For example, the impingement hole 104 directs cooling air out of the airfoil 100 in order to cool an exterior surface of the airfoil 100 when the turbine is operating.

A double impingement slot cap assembly 106 disposed at the leading edge 112 of the airfoil 100 forms a cap over the impingement hole 104. For example, the slot cap assembly 106 has an external surface 108 and an opposite interior surface 110. The external surface 108 is common with the leading edge 112 of the airfoil 100. For example, the external surface 108 is positioned facing away from the airfoil 100. The interior surface 110 is positioned facing towards the impingement hole 104 within the interior of the airfoil 100. The impingement hole 104 is configured to direct cooling air out of the cooling chamber 102 towards the interior surface 110 of the slot cap assembly 106. For example, the impingement hole 104 directs cooling air to the interior surface 110 in order to cool the interior surface 110 of the slot cap assembly 106 at the stagnation region when the turbine assembly is operating.

The double impingement slot cap assembly 106 is elongated along the stagnation region 130 in a direction along the radial length 124. For example, the slot cap assembly 106 is elongated between the first and second ends 134, 136 of the airfoil 100. Additionally, the slot cap assembly 106 is elongated along the leading edge 112 of the airfoil 100. For example, the external and interior surfaces 108, 110 of the slot cap assembly 106 are elongated between the pressure and suction sides 114, 116 of the airfoil.

The double impingement slot cap 106 may comprise a material commonly used in airfoils 100 and/or turbine assemblies. The slot cap 106 and the airfoil 100 may comprise a common material. For example, the airfoil 100 and the slot cap 106 may comprise a common metal alloy such as nickel, ceramic material, or the like. Optionally, the slot cap 106 may comprise a unique material as the airfoil 100.

The slot cap assembly 106 is coupled with the airfoil 100 by one or more supports 132. The supports 132 may be multiple pins along the radial length 124 of the airfoil 100. Optionally, the supports 132 may be one or more ribs along the radial length 124. The supports 132 may be aligned with or staggered from the impingement hole 104 along the radial length 124. The supports 132 are positioned, shaped and sized to support the mechanical loads for holding the slot cap 106 in place. For example, the supports 132 may be any shape and/or size based on the mechanical and thermal requirements of the turbine assembly. Optionally, the supports 132 may improve the heat transfer between a coolant and the slot cap 106, or the like.

The slot cap assembly 106 is mechanically coupled to the airfoil 100 by the supports 132. For example, the supports 132 may be cast and/or machined into the airfoil 100, and the slot cap 106 welded to the supports 132. Alternatively, the supports 132 may be cast and/or machined with the slot cap 106, and the supports 132 welded to the airfoil 100. Optionally, the supports 132 may be printed directly onto the airfoil 100, printed then welded to the airfoil 100, may be cast with the airfoil 100, may be cast with the slot cap 106, or the like. For example, the airfoil 100 may be cast with a first alloy and the supports 132 and slot cap 106 integrally cast with a second alloy that is different than the first alloy, such that the first alloy may be welded with the second alloy. Optionally, another mechanical fastening method may be used.

Figure 2:
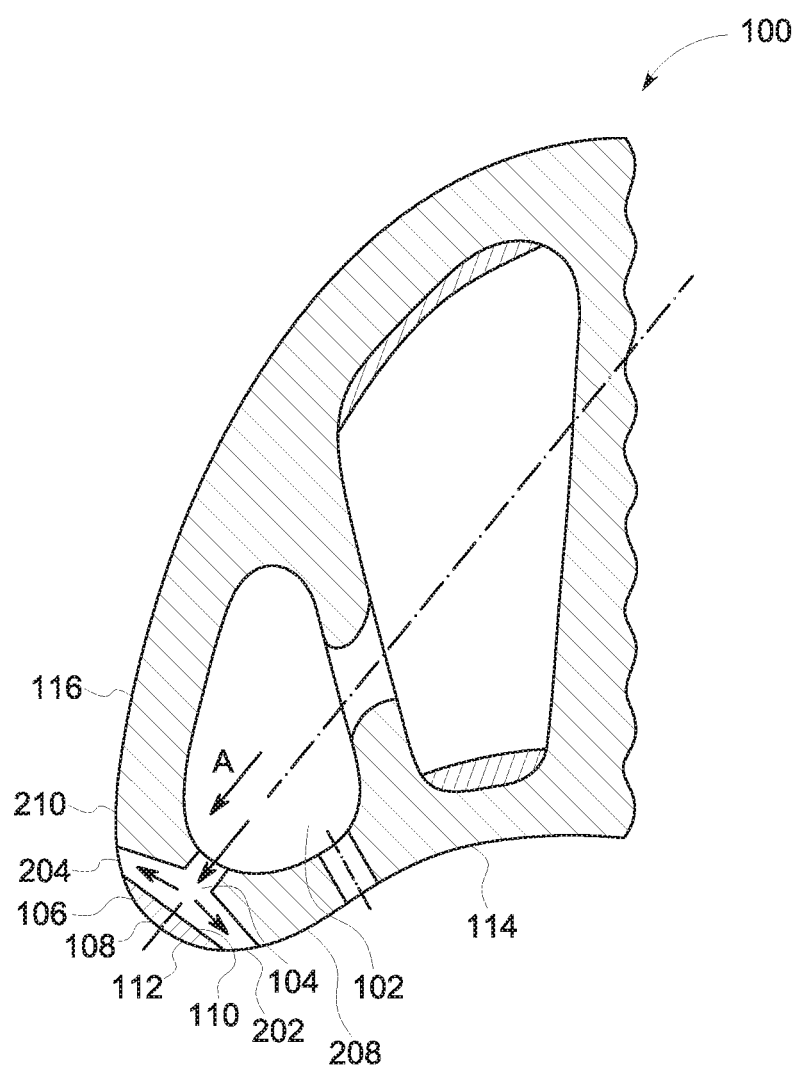
FIG. 2 illustrates a cross-sectional view of an airfoil in accordance with one embodiment.

FIG. 2 is a cross-sectional view of the airfoil 100 in accordance with one embodiment. The cooling chamber 102, fluidly coupled with the impingement hole 104, directs cooling air out of the airfoil 100 in a direction A. The slot cap assembly 106 is disposed at the leading edge 112 of the airfoil, such that the slot cap 106 forms a cover over the impingement hole 104.

A first slot 202 and an opposite second slot 204 are fluidly coupled with the impingement hole 104 under the cover of the slot cap assembly 106. The first slot 202 is open to the pressure side 114 of the airfoil 100. For example, the first slot 202 is open to pressure side 114 of the airfoil 100 on a first side of the stagnation region 130 (of FIG. 1). The opposite second slot 204 is open to the suction side 116 of the airfoil 100. For example, the second slot 204 is open to the suction side 116 of the airfoil 100 on a second side of the stagnation region 130. The opposite slots 202, 204 are an open passage between the impingement hole 104 and the pressure and suction sides 114, 116 of the airfoil 100. For example, cooling air is directed out of the cooling chamber 102, through the impingement hole 104, through the opposite slots 202, 204 to the pressure side 114 and to the opposite suction side 116 of the airfoil 100 as hot compressed air transfers downstream from the stagnation region 130 when the turbine is operating.

The double impingement slot cap assembly 106 is spaced apart from the airfoil 100 by the opposite slots 202, 204. The opposite slots 202, 204 are elongated in a direction extending along the leading edge 112 of the airfoil 100. For example, the opposite slots 202, 204 extend in a direction generally parallel with the elongated direction of the leading edge 112. The opposite slots 202, 204 provide a passage between the cooling chamber 102 and the pressure and suction sides 114, 116 of the airfoil 100 proximate the leading edge 112. For example, the opposite slots 202, 204 are located proximate to the leading edge 112, and positioned between the leading edge 112 and the trailing edge 120 (of FIG. 1) along the axial length 126 of the airfoil 100.

The opposite slots 202, 204 direct at least some cooling air exiting the cooling chamber 102 through the impingement hole 104 along a first exterior surface 208 and a different second exterior surface 210 of the airfoil 100. In the illustrated embodiment, the first exterior surface 208 is on the pressure side 114 of the airfoil 100, and the second exterior surface 210 is on the suction side 116 of the airfoil 100. The first slot 202, fluidly coupled with the impingement hole 104, directs some of the cooling air out of the cooling chamber 102 to the first exterior surface 208. For example, the first slot 202 directs cooling air to the first exterior surface 208 on the pressure side 114 of the airfoil 100. Additionally, the second slot 204, fluidly coupled with the impingement hole 104, directs some of the cooling air out of the cooling chamber 102 to the second exterior surface 210. For example, the second slot 204 directs cooling air to the second exterior surface 210 on the suction side 116 of the airfoil 100.

Figure 3:
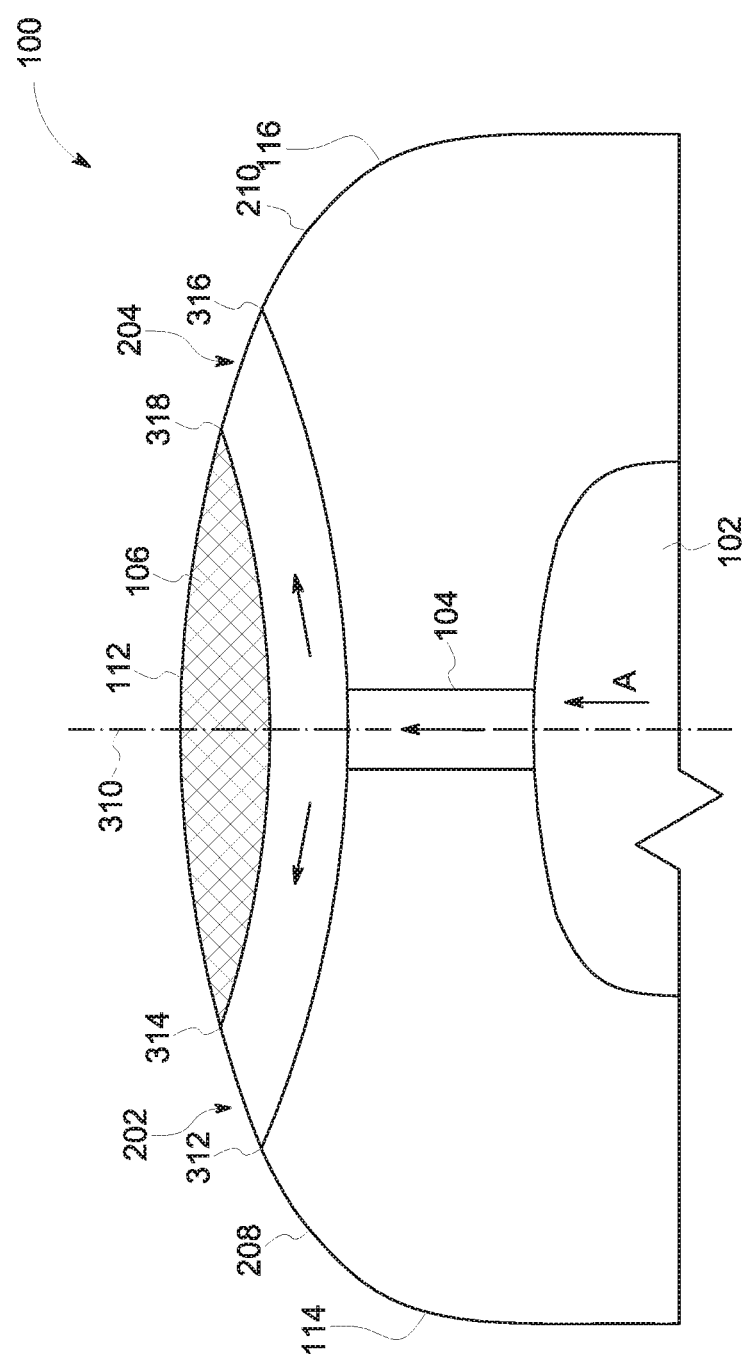
FIG. 3 illustrates a cross-sectional view of a leading edge of an airfoil in accordance with one embodiment.

FIG. 3 is a cross-sectional view of the slot cap assembly 106 at the leading edge 112 of the airfoil 100 in accordance with one embodiment. The opposite slots 202, 204 fluidly couple the impingement hole 104 with the exterior of the airfoil 100. For example, the first slot 202 fluidly couples the impingement hole 104 with the first exterior surface 208 of the airfoil 100, and the second slot 204 fluidly couples the impingement hole 104 with the second exterior surface 210 of the airfoil 100.

The impingement hole 104 is elongated along a longitudinal axis 310. The opposite slots 202, 204 are elongated in a direction along the leading edge 112 of the airfoil 100 in a direction generally perpendicular to the longitudinal axis 310. For example, the impingement hole 104 with the opposite slots 202, 204 form a T-shape proximate the leading edge 112 of the airfoil 100. The slot cap assembly 106 is disposed generally centered about the longitudinal axis 310 and forms a cover over the impingement hole 104. The slot cap assembly 106 is separated from the airfoil 100 by the opposite slots 202, 204. The slot cap assembly 106 is separated from the airfoil 100 by the opposite slots 202, 204 in a direction extending along the leading edge 112 of the airfoil 100. For example, the slot cap assembly 106 is disposed a distance apart from the airfoil 100 along the longitudinal axis 310 by a distance equivalent to the size and/or shape of the opposite slots 202, 204. The slot cap assembly 106 is separated from the airfoil 100 by the opposite slots 202, 204 in a direction extending along the stagnation region 130 (of FIG. 1). For example, the slot cap assembly 106 is disposed a distance apart from the airfoil 100 between the first end 134 and the second end 136 (of FIG. 1) along the stagnation region 130.

The first slot 202 is generally mirrored with the second slot 204 about the longitudinal axis 310. For example, the opposite slots 202, 204 have a common shape and size on opposite sides of the longitudinal axis 310. Optionally, the first slot 202 may have a shape and/or size that is unique to a shape and/or size of the second slot 204. The first and second slots 202, 204 extend generally perpendicular to the longitudinal axis 310. For example, the first and second slots 202, 204 are transversely oriented with respect to the impingement hole 104. Optionally, the first and second slots 204 may be axially oriented with respect to the longitudinal axis 310. Optionally, the first and second slots 204 may extend in a common axial orientation mirrored about the longitudinal axis 310. Optionally, the first slot 202 may extend in a unique orientation with respect to the opposite second slot 204.

The first slot 202 has an opening at the pressure side 114 of the airfoil 100 that is elongated between a first surface 312 and a second surface 314. The second slot 204 has an opening at the suction side 116 of the airfoil 100 that is elongated between a first surface 316 and a second surface 318. In the illustrated embodiments, the elongated opposite slots 202, 204 are generally the same shape and size. Optionally, the first slots 202 may have an opening with a unique shape and/or size. For example, a distance between the first and second surfaces 312, 314 of the first slot 202 may be larger or smaller than a distance between the first and second surfaces 316, 318 of the second slot 204. Optionally, a distance between the second surface 314 and the longitudinal axis 310 may be larger or smaller than a distance between the second surface 318 and the longitudinal axis 310. For example, the first slot 202 may have an opening at the pressure side 114 that is positioned closer to the longitudinal axis 310 than the second slot 204.

Figure 4:
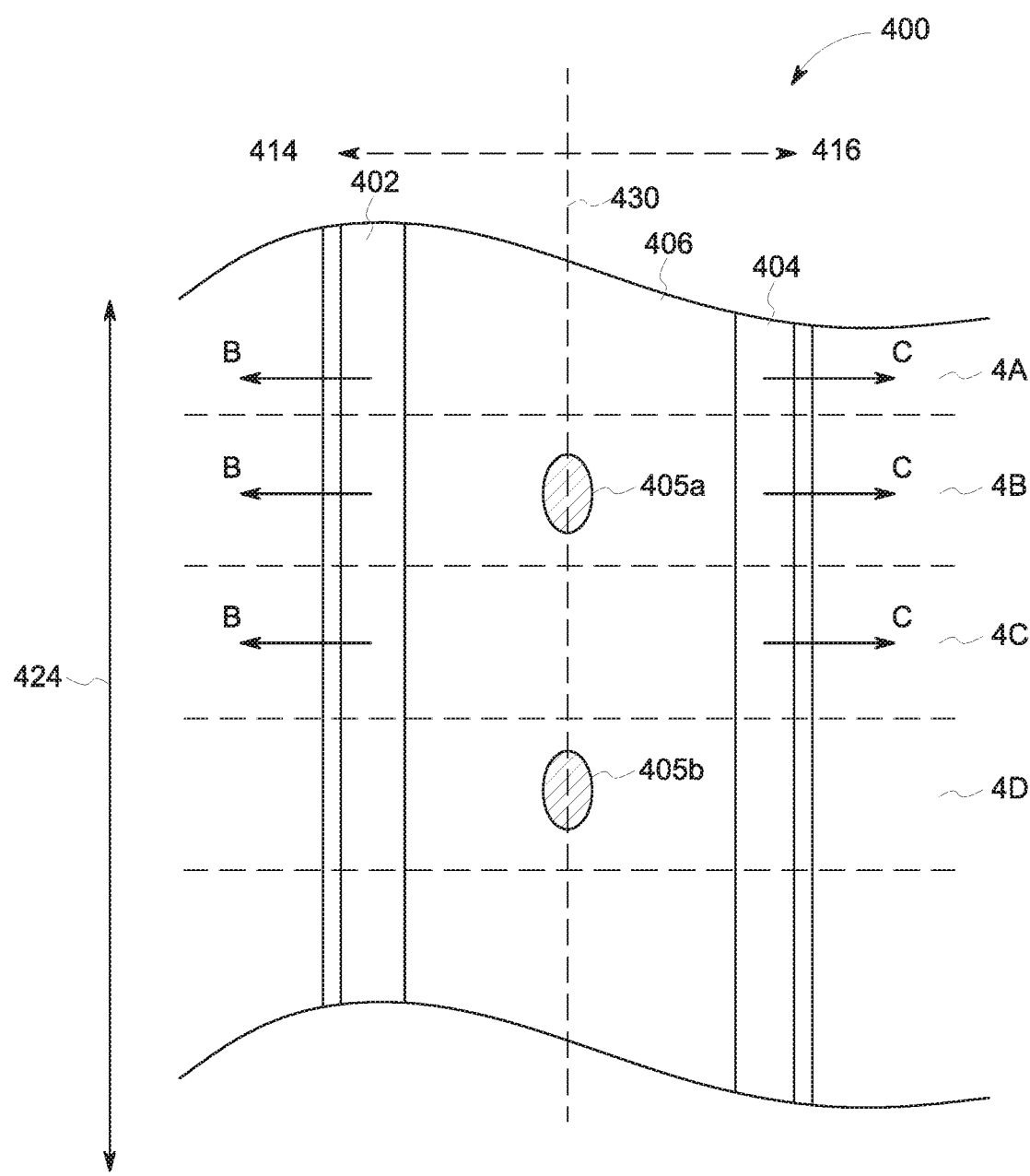
FIG. 4 illustrates a front view of an airfoil in accordance with one embodiment.
Figure 5:
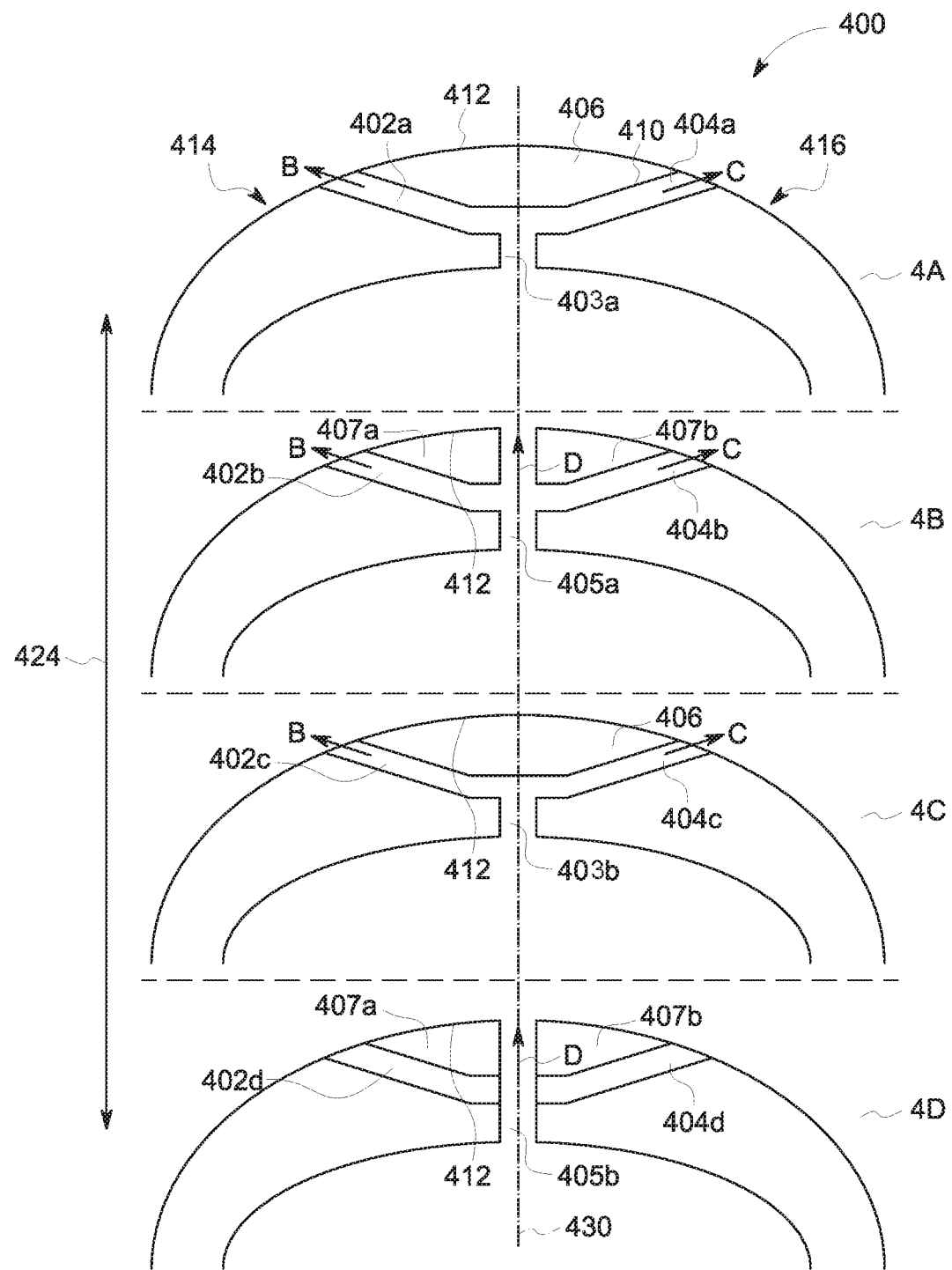
FIG. 5 illustrates a cross-sectional front view of the airfoil of FIG. 4 in accordance with one embodiment.

FIG. 4 is a front view of an airfoil 400 (corresponding to the airfoil 100 of FIG. 1). FIG. 5 is a cross-sectional front view of the airfoil 400. FIGS. 4 and 5 will be discussed together. The airfoil 400 is elongated along a radial length 424 (corresponding to the radial length 124 of FIG. 1). The airfoil 400 is illustrated cut into four sections 4A, 4B, 4C, and 4D. A stagnation region 430 (corresponding to the stagnation region 130 of FIG. 1) divides the airfoil 400 between a pressure side 414 and a suction side 416. A double impingement slot cap assembly 406 is generally centered about and elongated along the stagnation region 430. Opposite slots 402, 404 are disposed on opposite sides of the stagnation region 430. For example, the first slot 402 is an open passage from the interior of the airfoil 400 to the pressure side 414, and the opposite second slot 404 is a passage from the interior of the airfoil 400 to the suction side 416 of the airfoil 400. Cooling air flows out of the airfoil 400 from the first slot 402 in a direction B. Cooling air flows out of the airfoil 400 from the second slot 404 in a direction C. The cooling air flowing in the directions B and C from opposite slots 402, 404 cools the exterior of the airfoil 400 on opposite sides of the stagnation region 430.

Turning to FIG. 5, the four sections 4A-D are illustrated as cross-sectional views of the airfoil 400 along the radial length 424 of the airfoil 400 along the stagnation region 430. Section 4A has a first pair of opposite slots 402a, 402b fluidly coupled with a first impingement hole 403a. The opposite slots 402a, 404a are transversely oriented with respect to the first impingement hole 403a. Cooling air is directed from a cooling chamber (corresponding to the cooling chamber 102 of FIG. 1), through the impingement hole 403a, and at least some of the cooling air is directed through the first slot 402a to the pressure side 414 of the airfoil 400, and at least some of the cooling air is directed through the second slot 404a to the suction side of the airfoil 400.

Section 4B illustrates an alternative configuration of the slot cap assembly 406 along the radial length 424 of the airfoil 400. Section 4B has a second pair of opposite slots 402b, 404b. The slots 402b, 404b are fluidly coupled with a first cap film hole 405a. The first cap film hole 405a is fluidly coupled with a cooling chamber inside of the airfoil 400 to direct cooling air exiting the cooling chamber to a leading edge 412 of the airfoil 400. The size and/or shape of the first cap film hole 405a may vary. The first cap film hole 405a directs at least some of the cooling air through the first slot 402b to the pressure side 414, directs at least some of the cooling air through the second slot 404b to the suction side 416, and directs at least some of the cooling air through the first cap film hole 405a to the leading edge 412 of the airfoil 400. For example, the first cap film hole 405a directs cooling air exiting the cooling chamber to the stagnation region 430 in a direction D. The first cap film hole 405a divides the double impingement slot cap assembly 406 at the stagnation region 430. For example, the double impingement slot cap assembly 406 is divided into a first half 407a and an opposite second half 407b by the first cap film hole 405a at the leading edge 412 of the airfoil 400.

Continuing along the radial length 424 of the airfoil 400, section 4C has a configuration similar to section 4A. For example, section 4C has a third pair of opposite slots 402c, 404c that are fluidly coupled with a second impingement hole 403b.

Continuing along the radial length 424 of the airfoil 400, Section 4D illustrates an alternative configuration of the slot cap assembly 406. Section 4D has a second cap film hole 405b fluidly coupled with a cooling chamber inside of the airfoil 400 to direct cooling air exiting the cooling chamber to the leading edge 412. The size and/or shape of the second cap film hole 405b may vary. In the illustrated embodiment, the second cap film hole 405b directs cooling air from the cooling chamber through the second cap film hole 405b to the leading edge 412 of the airfoil 400 and does not direct cooling air through slots to the pressure or suction sides 414, 416. For example, the second cap film hole 405b is not fluidly coupled with opposite slots 402d, 404d. The second cap film hole 405b directs cooling air exiting the cooling chamber to the stagnation region 430 in the direction D.

In the illustrated embodiment of FIG. 5, Section 4B illustrates the first cap film hole 405a fluidly coupled with both the first and second slots 402b, 404b. Section 4D illustrates the second cap film hole 405b not fluidly coupled with first and second slots 402d, 404d. Optionally, the first and second cap film holes 405a, 405b may be fluidly coupled with one or more opposite slots. For example, the first cap film hole 405a may be fluidly coupled with the first slot 402a but not the second slot 404b. Optionally, the first and second cap film holes 405a, 405b may not be fluidly coupled with the opposite slots. For example, the first cap film hole 405a may not be fluidly coupled with opposite slots 402b, 404b. Optionally, the first cap film hole 405a may be fluidly coupled with first and/or second slots in any uniform or unique combination to the second cap film hole 405b.

Returning to FIG. 4, the first and second cap film holes 405a, 405b are illustrated as open passages directing cooling air outside of the airfoil 400 to the stagnation region 430 along the double impingement slot cap assembly 406 in alternating sections 4B and 4D.

FIGS. 4 and 5 illustrate one example the airfoil 400 including four sections (4A-D) having an alternating pattern. Alternatively, the airfoil 400 may include any number of sections and/or the sections may be configured in any order or pattern (e.g., alternating, non-alternating, random, or the like). Optionally, the airfoil 400 may have any alternative alternating section configuration. For example, the airfoil 400 may have a configuration with the order of sections being 4A-4B-4D-4C, 4A-4C-4B-4D, or the like.

Figure 6:
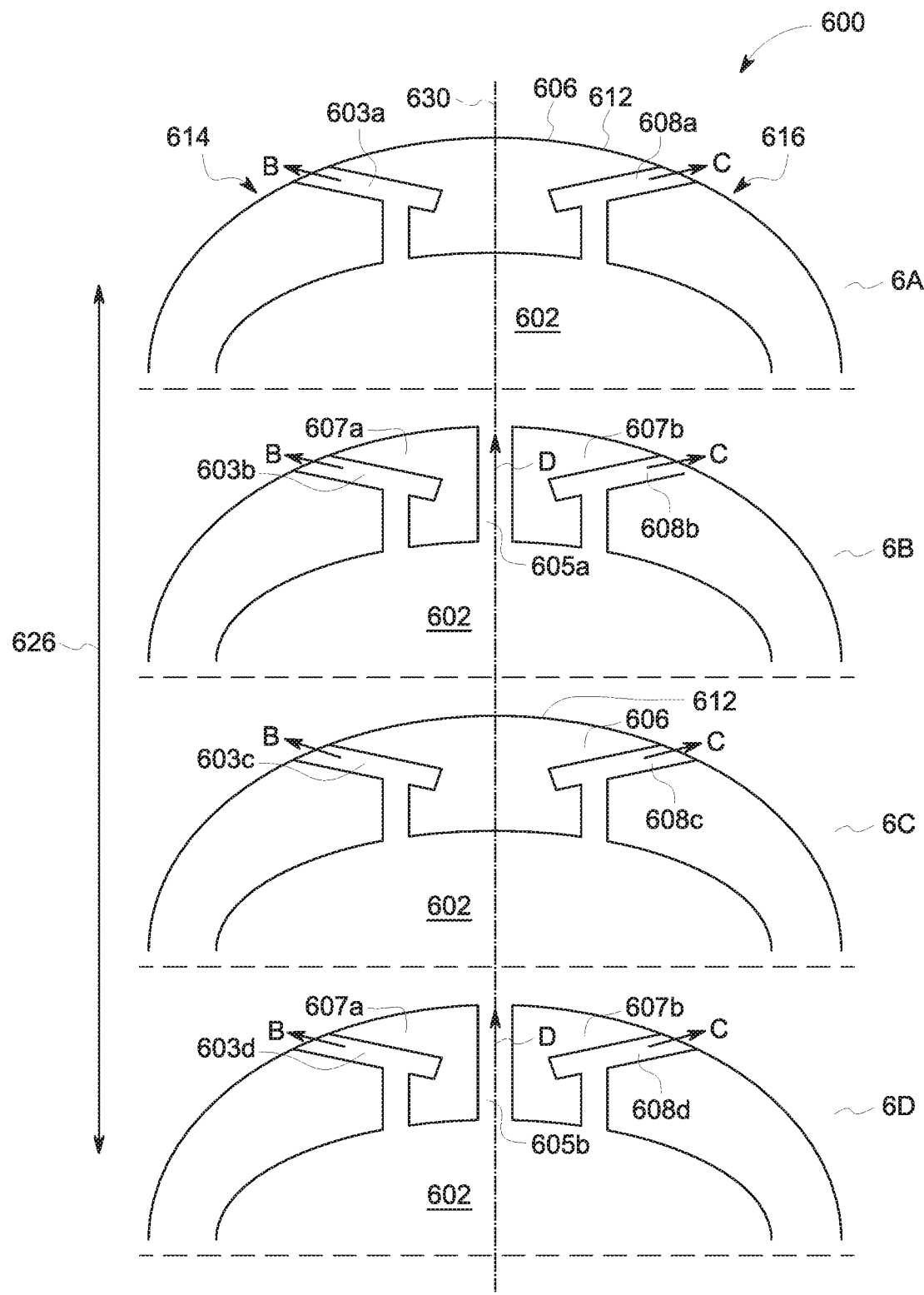
FIG. 6 illustrates a cross-sectional front view of an airfoil in accordance with one embodiment.

FIG. 6 illustrates a cross-sectional front view of an airfoil 600. The airfoil 600 has four sections 6A-D (corresponding to sections 4A-D of FIGS. 4 and 5) along a radial length 624 of the airfoil 600 along the stagnation region 630. Section 6A has a first pair of opposite metering slots 603a, 608a. The opposite metering slots 603a, 608a are fluidly coupled with a cooling chamber 602 (corresponding to the cooling chamber 102 of FIG. 1). A double impingement slot cap assembly 606 forms a cover at a leading edge 612 of the airfoil 600. The slot cap assembly 606 is separated from the airfoil 600 by the opposite metering slots 603a, 608a. The opposite metering slots 603a, 608a direct cooling air exiting the cooling chamber 602 to an exterior surface of the airfoil 600. For example, the first metering slot 603a directs cooling air to a pressure side 614 of the airfoil 600 in a direction B. Additionally, the second metering slot 608a directs cooling air to a suction side 616 of the airfoil 600 in a direction C. The airfoil 600 is devoid an impingement hole. For example, the cooling chamber 602 is fluidly coupled directly to the opposite metering slots 603a, 608a to direct cooling air from the cooling chamber 602 to the exterior surface of the airfoil 600.

Section 6B illustrates an alternative configuration of the double impingement slot cap assembly 606 along the radial length 624. Section 6B has a second pair of opposite metering slots 603b, 608b. The metering slots 603b, 608b are fluidly coupled with the cooling chamber 602. A first cap film hole 605a (corresponding to the first cap film hole 405a of FIG. 5) is fluidly coupled with the cooling chamber 602. The first metering slot 603b directs at least some of the cooling air exiting the cooling chamber 602 to the pressure side 614, the opposite second metering slot 608b directs at least some of the cooling air to the suction side 616, and the first cap film hole 605a directs at least some of the cooling air from the cooling chamber 602 to the leading edge 612 of the airfoil 600. For example, the first cap film hole 605a directs cooling air exiting the cooling chamber 602 to the stagnation region 630 in a direction D. The first cap film hole 605a divides the double impingement slot cap assembly 606 at the stagnation region 630. For example, the double impingement slot cap assembly 606 is divided into a first half 607a and an opposite second half 607b by the first cap film hole 605a at the leading edge 612.

Continuing along the radial length 624 of the airfoil 600, section 6C has a configuration similar to section 6A., and section 6D has a configuration similar to section 6B. For example, section 6C has a third pair of opposite metering slots 603c, 608c that are fluidly coupled with the cooling chamber 602, and section 6D has a fourth pair of opposite metering slots 603d, 608d, and a second film cooling hole 605b that are fluidly coupled with the cooling chamber 602.

In the illustrated embodiment of FIG. 6, Section 6B illustrates the first cap film hole 605a and both the first and second slots 402b, 404b fluidly coupled with the cooling chamber 602. Optionally, Section 6B may include the first cap film hole 605a and less than two metering slots fluidly coupled with the cooling chamber 602. For example, the cooling chamber 602 may be fluidly coupled with the first metering slot 602a but not the second metering slot 604b.

FIG. 6 illustrates one example of the airfoil 600 including four sections (6A-D) having an alternating pattern. Alternatively, the airfoil 600 may include any number of sections and/or the sections may be configured in any order or pattern (e.g., alternating, non-alternating). For example, any section may include less than two metering slots. Optionally, the airfoil 600 may have any alternative alternating section configuration. For example, the airfoil 600 may have a configuration with the order of sections being 6A-6B-6D-6C, 6A-6C-6B-6D, or the like.

Figure 7:
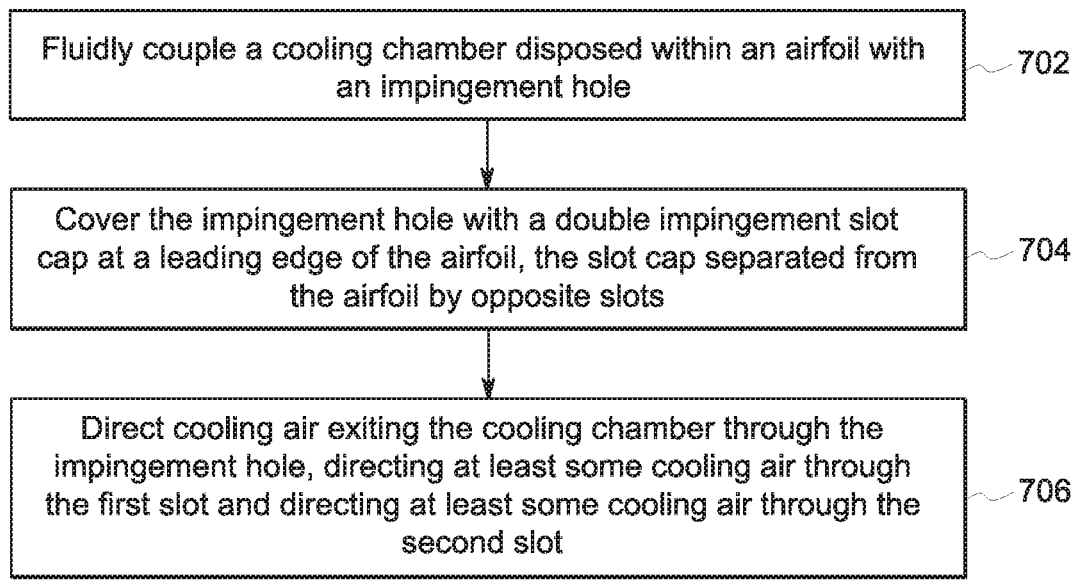
FIG. 7 illustrates a method flowchart in accordance with one embodiment.

FIG. 7 illustrates a method flowchart in accordance with one embodiment. At 702, a cooling chamber 102 disposed within an airfoil is fluidly coupled with an impingement hole 104. The impingement hole 104 is configured to direct at least some of the cooling air out of the cooling chamber 102.

At 704, the impingement hole 104 is covered by a double impingement slot cap assembly 106. The slot cap assembly 106 is disposed at the leading edge 112 of the airfoil 100. The slot cap assembly 106 is separated from the airfoil 100 by opposite slots 202, 204. For example, the slot cap assembly 106 is positioned a distance away from the airfoil 100 by the shape and size of the opposite slots 202, 204.

At 706, the impingement hole 104 directs cooling air exiting the cooling chamber 102 through the fluidly coupled opposite slots 202, 204 to the exterior of the airfoil 100. For example, the impingement hole 104 directs at least some of the cooling air through the first slot 202 to a pressure side 114 of the airfoil 100. Additionally, the impingement hole 104 directs at least some of the cooling air through the second slot 204 to a suction side 116 of the airfoil 100.

In one embodiment, an assembly comprises a cooling chamber disposed inside an airfoil of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly directs the cooling air exiting the cooling chamber in the airfoil through the impingement hole along one or more outer surfaces of the airfoil.

Optionally, the double impingement slot cap assembly is elongated along a leading edge of the airfoil. Optionally, the double impingement slot cap assembly is elongated along a stagnation region of the airfoil. The double impingement slot cap assembly is separated from the airfoil by opposite slots that are elongated in directions extending along one or more of the leading edge of the airfoil or the stagnation region of the airfoil.

Optionally, each of the opposite slots separating the double impingement slot cap assembly from the airfoil directs at least some of the cooling air exiting the cooling chamber through the impingement hole along different exterior surfaces of the airfoil. Optionally, the double impingement slot cap is separated from the airfoil by a first slot and an opposite second slot, wherein the first slot is elongated on a first side of a stagnation region of the airfoil and the second slot is elongated on an opposite second side of the stagnation region. The double impingement slot cap assembly is spaced apart from the airfoil and is coupled with the airfoil by one or more supports.

Optionally, the double impingement slot cap assembly is spaced apart from the airfoil to form one or more opposite slots that are transversely oriented with respect to the impingement hole and that are configured to direct at least some of the cooling air along exterior surfaces of the airfoil. The airfoil is elongated along a radial direction of the turbine assembly, and further comprising one or more cap film holes and one or more additional opposite slots. The one or more cap film holes and the one or more additional opposite slots alternate with the one or more opposite slots along the radial direction. The impingement hole is configured to direct cooling out of the cooling chamber to an interior surface of the double impingement slot cap assembly.

In one embodiment, an assembly comprise a cooling chamber disposed inside of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly directs the cooling air exiting the cooling chamber in the airfoil through the impingement hole along one or more outer surfaces of the airfoil. The double impingement slot cap assembly is spaced apart from the airfoil and is coupled with the airfoil by one or more supports.

Optionally, the double impingement slot cap assembly is elongated along a leading edge of the airfoil. Optionally, the double impingement slot cap assembly is elongated along a stagnation region of the airfoil. The double impingement slot cap assembly is separated from the airfoil by opposite slots that are elongated in directions extending along one or more of the leading edge of the airfoil or the stagnation region of the airfoil.

Optionally, each of the opposite slots separating the double impingement slot cap assembly from the airfoil directs at least some of the cooling air exiting the cooling chamber through the impingement hole along different exterior surfaces of the airfoil. Optionally, the double impingement slot cap is separated from the airfoil by a first slot and an opposite second slot, wherein the first slot is elongated on a first side of a stagnation region of the airfoil and the second slot is elongated on an opposite second side of the stagnation region.

Optionally, the double impingement slot cap assembly is spaced apart from the airfoil to form one or more opposite slots that are transversely oriented with respect to the impingement hole and that are configured to direct at least some of the cooling air along exterior surfaces of the airfoil. The airfoil is elongated along a radial direction of the turbine assembly, and further comprising one or more cap film holes and one or more additional opposite slots. The one or more cap film holes and the one or more additional opposite slots alternate with the one or more opposite slots along the radial direction. The impingement hole is configured to direct cooling out of the cooling chamber to an interior surface of the double impingement slot cap assembly.

In one embodiment, an assembly comprises a cooling chamber disposed inside an airfoil of a turbine assembly. The cooling chamber directs cooling air inside the airfoil. The assembly comprises an impingement hole fluidly coupled with the cooling chamber. The impingement hole directs at least some of the cooling air out of the cooling chamber. A double impingement slot cap assembly forms a cover over the impingement hole. The double impingement slot cap assembly is separated from the airfoil by opposite slots that are elongated in directions extending along one or more of the leading edge of the airfoil or the stagnation region of the airfoil. The double impingement slot cap assembly directs the cooling air exiting the cooling chamber in the airfoil through the impingement hole along one or more outer surfaces of the airfoil. The double impingement slot cap assembly is spaced apart from the airfoil and is coupled with the airfoil by one or more supports.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain- English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly comprising:
    a cooling chamber disposed inside an airfoil, the cooling chamber configured to direct cooling air inside the airfoil;
    an impingement hole fluidly coupled with the cooling chamber, wherein a first end of the impingement hole is at the cooling chamber and a second end of the impingement hole opposite the first end is spaced apart from the cooling chamber, the impingement hole configured to direct at least some of the cooling air out of the cooling chamber in a direction from the first end towards the second end; and
    a double impingement slot cap assembly forming a cover over the impingement hole, wherein the double impingement slot cap assembly is separated from the airfoil by opposite first and second slots that diverge from the second end of the impingement hole to respective openings of the first and second slots, wherein the openings of the first and second slots are disposed along different exterior surfaces of the airfoil and are both elongated along a radial length of the airfoil parallel to a leading edge of the airfoil,
    wherein the openings of the first and second slots are axially located between the leading edge of the airfoil and the first end of the impingement hole at the cooling chamber.

2. The assembly of claim 1, wherein the double impingement slot cap assembly is elongated along the leading edge of the airfoil.

3. The assembly of claim 1, wherein the double impingement slot cap assembly is elongated along a stagnation region of the airfoil.

4. The assembly of claim 1, wherein the opposite first and second slots separating the double impingement slot cap assembly from the airfoil direct at least some of the cooling air exiting the cooling chamber through the impingement hole along the different exterior surfaces of the airfoil.

5. The assembly of claim 1, wherein the opening of the first slot is on a pressure side of the airfoil and the opening of the second slot is on a suction side of the airfoil.

6. The assembly of claim 1, wherein the double impingement slot cap assembly is spaced apart from the airfoil and is coupled with the airfoil by one or more supports.

7. The assembly of claim 1, wherein the opposite first and second slots are transversely oriented with respect to the impingement hole and are configured to direct at least some of the cooling air along the exterior surfaces of the airfoil.

8. The assembly of claim 1, wherein the double impingement slot cap assembly defines one or more cap film holes therethrough that are configured to direct the cooling air to the leading edge of the airfoil.

9. The assembly of claim 1, wherein the impingement hole is configured to direct cooling air out of the cooling chamber to an interior surface of the double impingement slot cap assembly.

10. An assembly comprising:
    a first cooling chamber and a second cooling chamber disposed inside an airfoil, the first and second cooling chambers configured to direct cooling air inside the airfoil, the second cooling chamber axially disposed between the first cooling chamber and a leading edge of the airfoil;
    a first impingement hole axially disposed between the first cooling chamber and the second cooling chamber to fluidly couple the first cooling chamber with the second cooling chamber through the first impingement hole, the first impingement hole configured to direct at least some of the cooling air from the first cooling chamber into the second cooling chamber;
    a second impingement hole axially disposed between the second cooling chamber and the leading edge of the airfoil, the second impingement hole fluidly coupled to the second cooling chamber; and
    a double impingement slot cap assembly forming a cover over the second impingement hole, wherein the double impingement slot cap assembly is separated from the airfoil by opposite first and second slots that diverge from the second impingement hole to respective openings of the first and second slots, wherein the openings of the first and second slots are disposed along different exterior surfaces of the airfoil and are both elongated along a radial length of the airfoil parallel to the leading edge of the airfoil.

11. The assembly of claim 10, wherein the double impingement slot cap assembly is elongated along the leading edge of the airfoil.

12. The assembly of claim 10, wherein the double impingement slot cap assembly is spaced apart from the airfoil and is coupled with the airfoil by one or more supports.

13. The assembly of claim 10, wherein the opposite first and second slots separating the double impingement slot cap assembly from the airfoil direct at least some of the cooling air exiting the second cooling chamber through the second impingement hole along the different exterior surfaces of the airfoil.

14. The assembly of claim 10, wherein the opening of the first slot is on a pressure side of the airfoil and the opening of the second slot is on a suction side of the airfoil.

15. The assembly of claim 10, wherein the opposite first and second slots are transversely oriented with respect to the impingement hole and are configured to direct at least some of the cooling air along the exterior surfaces of the airfoil.

16. The assembly of claim 10, wherein the double impingement slot cap assembly defines one or more cap film holes therethrough that are configured to direct the cooling air to the leading edge of the airfoil.

17. The assembly of claim 10, wherein the second impingement hole is configured to direct cooling air out of the cooling chamber to an interior surface of the double impingement slot cap.

18. An assembly comprising:
- a cooling chamber disposed inside an airfoil, the cooling chamber configured to direct cooling air inside the airfoil;
- an impingement hole fluidly coupled with the cooling chamber, wherein a first end of the impingement hole is at the cooling chamber and a second end of the impingement hole opposite the first end is spaced apart from the cooling chamber, the impingement hole configured to direct at least some of the cooling air out of the cooling chamber in a direction from the first end towards the second end; and
- a double impingement slot cap assembly forming a cover over the impingement hole, the double impingement slot cap assembly is separated from the airfoil by opposite first and second slots that diverge from the second end of the impingement hole to respective openings of the first and second slots, wherein the openings of the first and second slots are disposed along different exterior surfaces of the airfoil and are both elongated along a radial length of the airfoil parallel to a leading edge of the airfoil, wherein the double impingement slot cap assembly is spaced apart from the airfoil and is coupled with the airfoil by one or more supports, wherein an inner surface of the double impingement slot cap assembly defines portions of the first and second slots and the inner surface is one of planar or convex, the convex inner surface bowing towards the impingement hole.

19. The assembly of claim 1, wherein an inner surface of the double impingement slot cap assembly is convex such that the inner surface bows towards the impingement hole.

20. The assembly of claim 18, wherein the openings of the first and second slots are axially located between the leading edge of the airfoil and the first end of the impingement hole at the cooling chamber.

\* \* \* \* \*